(12) United States Patent
Arnold et al.

(10) Patent No.: US 10,351,665 B2
(45) Date of Patent: Jul. 16, 2019

(54) CRYSTAL NUCLEATING AGENTS FOR POLYHYDROXYALKANOATES

(71) Applicant: Meredian Bioplastics, Inc., Bainbridge, GA (US)

(72) Inventors: Rachelle Arnold, Bainbridge, GA (US); Adam Johnson, Bainbridge, GA (US)

(73) Assignee: Meredian Bioplastics, Inc., Bainbridge, GA (US)

( * ) Notice: Subject to any disclaimer, the term of this patent is extended or adjusted under 35 U.S.C. 154(b) by 3 days.

(21) Appl. No.: 15/786,848

(22) Filed: Oct. 18, 2017

(65) Prior Publication Data

US 2018/0105639 A1    Apr. 19, 2018

Related U.S. Application Data

(60) Provisional application No. 62/409,540, filed on Oct. 18, 2016.

(51) Int. Cl.

| | |
|---|---|
| *C08G 63/88* | (2006.01) |
| *C08G 63/06* | (2006.01) |
| *C08K 5/00* | (2006.01) |
| *C08K 5/05* | (2006.01) |
| *C08K 13/02* | (2006.01) |

(52) U.S. Cl.
CPC ............. *C08G 63/06* (2013.01); *C08G 63/88* (2013.01); *C08K 5/0083* (2013.01); *C08K 5/05* (2013.01); *C08K 13/02* (2013.01); *C08G 2250/00* (2013.01); *C08K 2201/002* (2013.01)

(58) Field of Classification Search
USPC ................................................ 528/271, 272
See application file for complete search history.

(56) References Cited

U.S. PATENT DOCUMENTS

| | | | |
|---|---|---|---|
| 5,292,860 | A | 3/1994 | Shiotani et al. |
| 5,650,555 | A | 7/1997 | Somerville et al. |
| 5,821,299 | A | 10/1998 | Noda |
| 5,849,854 | A | 12/1998 | Noda |
| 5,899,339 | A | 5/1999 | Noda |
| 5,918,747 | A | 7/1999 | Noda |
| 5,942,597 | A | 8/1999 | Noda et al. |
| 2006/0058498 | A1 | 3/2006 | Satkowski et al. |

FOREIGN PATENT DOCUMENTS

| | | |
|---|---|---|
| EP | 2881435 A1 | 6/2015 |
| WO | 9416000 A1 | 7/1994 |

OTHER PUBLICATIONS

International Search Report and Written Opinion for PCT/US2017/057110, dated Jan. 17, 2018, 12 pages.

*Primary Examiner* — Terressa Boykin
(74) *Attorney, Agent, or Firm* — Luedeka Neely Group, P.C.

(57) ABSTRACT

This invention relates to compositions and methods for increasing the crystallization rate and/or processing speed of polyhydroxyalkanoate (PHA) polymers. PHA polymers are notorious for slow crystallization rates, reducing the practicality for using PHA for consumer products. Compounds that have similar crystal structures to PHA and have a melting point higher than that of the PHA, such as pentaerythritol, as well as compounds that undergo a crystal structure change at or below the melting point of the polymer, such as sulfur or selenium, act as good crystal nucleators for PHA.

17 Claims, No Drawings

CRYSTAL NUCLEATING AGENTS FOR POLYHYDROXYALKANOATES

TECHNICAL FIELD

This invention relates to compositions and methods for increasing the crystallization rate and/or processing speed of polyhydroxyalkanoate polymers.

BACKGROUND OF THE INVENTION

Plastics such as polyesters are typically produced from petrochemical sources by well-known synthetic means. These petrochemical-based polymers can take centuries to degrade after disposal. Concern over plastic waste accumulation in the environment has resulted in a recent movement toward using biodegradable polymers instead.

Bio-based biodegradable polymers, also commonly referred to as "bioplastics," have not enjoyed great success in the marketplace due to their high production cost. However, advances in biotechnology have led to less expensive methods for their production. In one instance, biodegradable aliphatic copolyesters are now often produced by large-scale bacterial fermentation. Collectively termed polyhydroxyalkanoates, also known as "PHAs", these polymers can be synthesized from plant or bacteria fed with a particular substrate, such as glucose, in a fermentation plant. In many instances, the structural or mechanical properties of PHAs can be customized to fit the specifications of the desired end product. PHAs can degrade both aerobically and anaerobically.

PHAs are enormously versatile, and as many as 100 different PHA structures have been identified. PHA structures can vary in two ways. First, PHAs can vary according to the structure of the pendant groups, which are typically attached to a carbon atom having (D)-stereochemistry. The pendant groups form the side chain of hydroxyalkanoic acid not contributing to the PHA carbon backbone. Second, PHAs can vary according to the number and types of units from which they are derived. For example, PHAs can be homopolymers, copolymers, terpolymers, or higher combinations of monomers. These variations in PHA structure can cause variations in their physical characteristics. These physical characteristics allow PHAs to be used for a number of products that may be commercially valuable.

PHAs can be processed to produce articles for consumer use. Thermoplastic polymers including PHA can be transformed into articles for consumer use by first melting the polymer, shaping the molten polymer, and finally solidifying the polymer, normally by crystallization. Accordingly, crystallization rate is an important parameter that can control the rate of processing of PHA polymers. As a general rule, the faster the PHA can be crystallized, the faster the polymer can be processed. In addition, certain polymer forming processes including film blowing and melt fiber spinning may be difficult to perform in a practical manner if the crystallization does not occur fast enough. In these cases, the molten polymer is shaped in a way that is stable only over a short period of time. If crystallization does not occur within the necessary time frame, the process can be unsuccessful. Therefore, in some cases, the speed of crystallization weighs heavily on whether certain polymer processes are practical.

The patent application JP 07 188537 A (TOKUYAMA SODA KK) discloses a copolymer of hydroxybutyrate and hydroxyvalerate. Hydroxyvalerate is a HA unit which has only 5 carbon atoms. To raise the crystallization rate of the copolymer, this document discloses the addition of a fatty acid system compound chosen from fatty acid, fatty acid ester, fatty acid amine and fatty acid metal salt.

Therefore, there is a need for rapid processes and reagents that are useful for crystallizing PHA polymers. Such processes and reagents can be efficient, cost-saving, and suitable to large-scale processing of PHA materials.

BRIEF SUMMARY OF THE INVENTION

The present disclosure provides a process for crystallizing a polymer having at least 20 mole percent of hydroxyalkanoate repeat units, comprising admixing the polymer and a compound with a crystal structure similar to the PHA crystal structure, such as pentaerythritol, providing heterogeneous nucleation sites.

The present disclosure also provides a composition comprising a polymer having at least 20 mol percent of hydroxyalkanoate repeat units, and a compound that has allotropic character, such as sulfur and selenium.

More particularly, in a first aspect, the present disclosure provides a polymeric composition which includes at least a polymer and a nucleating agent, in an amount from about 0.01% to about 20% by weight of the polymer. The polymer including at least 20 mole percent hydroxyalkanoate repeat units. The nucleating agent is selected from the group consisting of (1) compounds having an orthorhombic crystal structure, (2) compounds having a hexagonal crystal structure, (3) compounds having a tetragonal crystal structure, (4) allotrophic elements having at least one crystalline form which is orthorhombic, hexagonal, or tetragonal, (5) polymorphic compounds having at least one crystalline form which is orthorhombic, hexagonal, or tetragonal, and (6) mixtures thereof.

In a second aspect, the present disclosure provides a process for crystallizing a polymer. According to one embodiment, the process includes a first step of admixing a polymer including at least 20 mole percent of hydroxyalkanoate repeat units with a nucleating agent, in an amount from about 0.01% to about 20% by weight of the polymer, at a first temperature, which is from about 5° C. to about 15° C. above the melting point of the polymer. The process also includes a second step of cooling the mixture to a second temperature, which is from about the glass transition temperature of the polymer to about the melting point of the nucleating agent.

The nucleating agent for the process is selected from the group consisting of (1) compounds having an orthorhombic crystal structure, (2) compounds having a hexagonal crystal structure, (3) compounds having a tetragonal crystal structure, (4) allotrophic elements having at least one crystalline form which is orthorhombic, hexagonal, or tetragonal, (5) polymorphic compounds having at least one crystalline form which is orthorhombic, hexagonal, or tetragonal, and (6) mixtures thereof.

In certain embodiments, the nucleating agent is preferably selected from the group consisting of pentaerythritol, dipentaerythritol, anatase, wulfenite, aragonite, sulfur, selenium, phosphorous, benzamide, and mixtures thereof. More preferably, the nucleating agent is pentaerythritol.

In some embodiments, the first temperature is preferably from about 100° C. to about 190° C. Moreover, in certain embodiments, the second temperature is preferably from about 50° C. to about 90° C.

In certain embodiments, the nucleating agent is preferably selected from the group consisting of (4) allotrophic elements having at least one crystalline form which is orthorhombic, hexagonal, or tetragonal, (5) polymorphic compounds having at least one crystalline form which is orthorhombic, hexagonal, or tetragonal, and (6) mixtures thereof. During the cooling steps, the nucleating agent transitions from a crystalline form which is not orthorhombic, hexagonal, or tetragonal to a crystalline form which is orthorhombic, hexagonal, or tetragonal.

In certain embodiments, the nucleating agent is preferably present in an amount from about 0.5% to about 5% by weight of the polymer.

In some embodiments, the polymer is preferably hydroxybutyrate-hydroxyhexanoate copolymer.

In certain embodiments, the polymer has a first repeat unit having the structure:

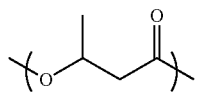

and a second repeat unit having h structure:

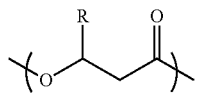

wherein each R is independently a C3 to C19 alkyl group, and wherein the polymer includes from about 75 mole percent to about 99 mole percent of the first repeat unit and from about 1 mole percent to about 25 mole percent of the second repeat unit.

In some embodiments, the polymer preferably has a weight average molecular weight from about 10,000 to about 3,000,000 daltons.

In certain embodiments, the polymer preferably has a melting point from about 100° C. to about 150° C.

In certain embodiments, the polymer preferably has a glass transition temperature from about −30° C. to about 10° C.

DETAILED DESCRIPTION AND BEST MODE OF IMPLEMENTATION

All percentages and ratios used herein are by weight of the total composition and all measurements are made at about 25° C., unless otherwise designated.

In one embodiment, the disclosure provides a process for crystallizing a polymer having at least 20 mole percent of hydroxyalkanoate repeat units, comprising admixing the polymer and a nucleating agent having a crystal structure similar to the PHA crystal structure, such as pentaerythritol, at a first temperature, which is from about 5° C. to about 15° C. above the melting point of the polymer; and cooling the polymer at a second temperature, which is from about the glass transition temperature of the polymer to about the melting point of the compound.

In one embodiment the disclosure provides a process for crystallizing a polymer having at least 20 mole percent of hydroxyalkanoate repeat units, comprising admixing the polymer and a nucleating agent that has a similar crystal structure to PHA.

In one embodiment, the nucleating agent s a polyol.

In one embodiment, the amount of the nucleating agent is sufficient to promote crystallization of the polymer.

In one embodiment, the first temperature is from about 100° C. to about 190° C.

In one embodiment, the second temperature is from about 50° C. to about 90° C.

In one embodiment, the cooling occurs for a time of from about 3 to about 30 seconds. In another embodiment, the cooling occurs for a time of from about 8 to about 20 seconds.

In one embodiment, the admixing comprises melt blending, solution blending, dry mixing, extrusion mixing, injection molding, pelletizing, blow molding, extrusion sheet forming, inflation forming, contour extrusion forming, vacuum pressure forming, blown film processing, extrusion coating, fiber spinning, or a combination thereof.

In one embodiment, the polymer has a melting point of from about 80° C. to about 160° C. In another embodiment, the polymer has a melting point of from about 100° C. to about 150° C.

In one embodiment, the polymer has a glass transition temperature of from about −30° C. to about 10° C.

In one embodiment, the nucleating agent has a melting point above the melting point of the polymer.

The polymer is other than poly(lactic acid), poly(glycolic acid), or a copolymer thereof.

In one embodiment, the nucleating agent has the formula $C(CH_2)_4(OH)_4$ whose chemical name is "pentaerythritol".

In one embodiment, the amount of the nucleating agent is the amount that is sufficient to promote crystallization of the polymer. In another embodiment, the amount is from about 0.01% to about 20% by weight of the polymer. In another embodiment, the amount of the nucleating agent is about 0.5% to about 5% by weight of the polymer. In one embodiment, the amount of the nucleating agent is from about 0.5% to about 1.5%, alternatively from about 2% to about 3% by weight of the polymer.

In one embodiment, the polymer is a hydroxybutyrate-hydroxyhexanoate copolymer. In one embodiment, the hydroxybutyrate-hydroxyhexanoate copolymer is a D-3-hydroxybutyrate-D-3-hydroxyhexanoate copolymer.

In one embodiment, the molecular weight of the polymer is from about 10,000 to about 3,000,000. In another embodiment, the molecular weight of the polymer is from about 300,000 to about 1,000,000.

In one embodiment, the polymer has a purity of at least about 90%. In another embodiment, the polymer has a purity of at least about 95%. In one embodiment, the polymer has a purity of at least about 98%.

In one embodiment, the first temperature is from about 130° C. to about 190° C.; the second temperature is from about 50° C. to about 90° C. The polymer has a first repeat unit having the structure:

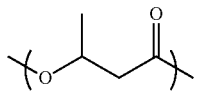

and a second repeat unit having the structure:

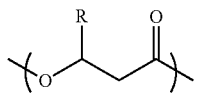

wherein each R is independently a $C_3$ to $C_{19}$ alkyl group; wherein the polymer has from about 75 mol % to about 99 mol % of the first repeat unit and from about 1 mol % to about 25 mol % of the second repeat unit. In one embodiment, each R is independently n-propyl, n-pentyl, n-heptyl, or n-nonyl.

In one embodiment, the disclosure provides a process for crystallizing a polymer having at least 20 mole percent of hydroxyalkanoate repeat units, comprising admixing the polymer and a nucleating agent with allotropic character.

In one embodiment, the amount of the nucleating agent is sufficient to promote crystallization of the polymer.

In one embodiment, the first temperature is from about 80° C. to about 160° C. In another embodiment, the polymer has a melting point from about 100° C. to about 150° C.

In one embodiment, the polymer has a glass transition temperature of from about −30° C. to about 10° C.

In one embodiment, the nucleating agent has a crystal structure transition at or below the melting point of the polymer.

The polymer is other than polylactic acid), poly glycolic acid), or a copolymer thereof.

In one embodiment, the nucleating agent is sulfur in another embodiment, the nucleating agent is selenium.

In one embodiment, the amount of the nucleating agent is the amount that is sufficient to promote crystallization of the polymer. In another embodiment, the amount is from about 0.01% to about 20% by weight of the polymer. In another embodiment, the amount of the nucleating agent is about 0.5% to about 5% by weight of the polymer. In one embodiment, the amount of the nucleating agent is from about 0.5% to about 1.5%, alternatively from about 2% to about 3% by weight of the polymer.

In one embodiment, the polymer is a hydroxybutyrate-hydroxyhexanoate copolymer. In one embodiment, the hydroxybutyrate-hydroxyhexanoate copolymer is a D-3-hydroxybutyrate-D-3-hydroxyhexanoate copolymer.

In one embodiment, the molecular weight of the polymer is from about 10,000 to about 3,000,000. In another embodiment, the molecular weight of the polymer is from about 300,000 to about 1,000,000.

In one embodiment, the polymer has a purity of at least about 90%. In another embodiment, the polymer has a purity of at least about 95%. In one embodiment, the polymer has a purity of at least about 98%.

The processes and methods herein may also include a wide variety of other variations. The processes and methods of the present disclosure are described in detail hereinafter.

1. Admixing the Polymer and a Nucleating Agent

In one embodiment, the present disclosure relates to a process for crystallizing a polymer having at least 20 mole percent of hydroxyalkanoate repeat units under selected process conditions.

a) Structurally Flexible PHAs:

The polymers of the present disclosure have at least 20 mole percent of hydroxyalkanoate repeat units.

In one embodiment, the polymers of the present disclosure contain PHAs selected from those referred to herein as "structurally flexible" PHAs, in that the physical disruption caused by the relatively high co-monomer content or particular pendant group chain length, make them generally more ductile and more difficult to crystallize than PHAs that are characterized by having lower co-monomer content and relatively short pendant groups. Such PHAs are describe for example in U.S. Pat. Nos. 5,602,227, RE 36,548, and 6,077,931, assigned to Procter and Gamble; and U.S. Pat. Nos. 6,043,063 and 6,087,471, assigned to Monsanto).

The PHAs useful in the present disclosure have a first repeat unit of the structure:

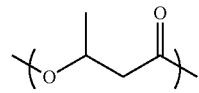

and a second repeat unit of the structure:

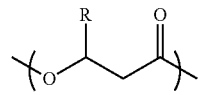

wherein each R is independently a $C_3$ to a $C_{19}$ alkyl group; wherein the polymer has from about 75 mol % to about 99 mol % of the first repeat unit, and from about 1 mol % to about 25 mol % of the second repeat unit. In one embodiment, each R is independently n-propyl, n-pentyl, n-heptyl, or n-nonyl.

The PHAs of the present disclosure can have a melt temperature ("Tm") of about 80° C. or higher. In one embodiment, the PHA has a melting point of from about 80° C. to about 160° C. In another embodiment, the PHA has a melting temperature of from about 80° C. to about 150° C.

In one embodiment, the PHA is a hydroxybutyrate-hydroxyhexanoate copolymer. In another embodiment, the hydroxybutyrate-hydroxyhexanoate copolymer is a D-3-hydroxybutyrate-D-3-hydroxyhexanoate copolymer. In one embodiment, the hydroxybutyrate-hydroxyhexanoate copolymer comprises from about 2 mol % to about 20 mol % hydroxyhexanoate copolymer. In another embodiment, the hydroxybutyrate-hydroxyhexanoate copolymer comprises from about 5 mol % to about 15 mol % hydroxyhexanoate copolymer.

The present disclosure is applicable to PHAs covering a wide range of molecular weights. In one embodiment, the polyhydroxyalkanoate has a molecular weight of from about 100,000 to about 1,500,000. In another embodiment, the PHA has a molecular weight of from about 300,000 to about 500,000.

b) Nucleating Agents with Similar Crystal Structures

Nucleating agents with rectangular prism structures in which all intersections within the unit cell are 90° angles, are useful for the present disclosure.

In one embodiment, the nucleating agent has an orthorhombic crystal structure. In another embodiment, the nucleating agent has a hexagonal crystal structure. In still another embodiment, the nucleating agent has a tetragonal crystal structure.

In certain embodiments, this nucleating agent may selected from the group consisting of pentaerythritol, dipentaerythritol, anatase, wulfenite, aragonite and mixtures thereof, In one preferred embodiment, the nucleating agent is a polyol, such as pentaerythritol.

C) Nucleating Agents with Allotropic Character

Suitable nucleating agents may also include compounds that undergo a crystal structure change at a temperature at or below the melting temperature of the polymer. In this regard, preferred nucleating agents include allotrophic elements or polymorphic compounds having at least one crystalline form which is orthorhombic, hexagonal, or tetragonal, and mixtures thereof. Suitable examples of such nucleating agents include sulfur, selenium, phosphorous, benzamide, and mixtures thereof. Particularly preferred examples include sulfur and selenium.

i) Synthesis of Nucleating Agents

Nucleating agents with similar crystal structures to PHA and with allotropic character can be obtained commercially or synthesized using methods that are well-known to those skilled in the art.

ii) Nucleating Agents

Nucleating agents with similar crystal structures to PHA, including calcium carbonate, are normally used as fillers in plastics. Other nucleating agents with a similar structure to PHA, such as pentaerythritol, are used as an organic building block for polyfunctionalized nucleating agents. According to the present disclosure, applicants believe that these nucleating agents, as well as other nucleating agents with similar crystal structures to PHA, are useful as a nucleating agent for PHAs. In one embodiment, the nucleating agents as described above decrease the crystallization process time when blended with PHAs.

Polyhydroxyalkanoates can be difficult to nucleate, and nucleating agents can be very specific to the type of polymer being nucleated. In one embodiment, the nucleating agents' efficacy depends upon their ability to create an energetically favored surface on which new polymer crystals can form, which in turn can depend on the crystal structure of the polymer to be nucleated.

Applicants believe that nucleating agents having a similar crystal structure to PHA and a particular melting point profile are efficient nucleating agents for PHAs. In one embodiment, the nucleating agent has a melting point above the melting point of the polymer.

In one embodiment, the nucleating agent is $C(CH_2)_4(OH)_4$. In one embodiment, the nucleating agent is pentaerythritol.

In one embodiment, the nucleating agent undergoes a crystal structure change at or below the melting point of the polymer. In another embodiment, the nucleating agent is sulfur or selenium.

In one embodiment, the amount of nucleating agent useful in the present methods or compositions is from about 0.01% to about 20% by weight of the polymer. In another embodiment, the amount of nucleating agent is from about 0.5% to about 5% by weight of the polymer. In another embodiment, the amount of nucleating agent is from about 0.5% to about 1.5%, alternatively from about 2% to about 3% by weight of the polymer.

In another embodiment, the nucleating agents that are useful in the present disclosure do not introduce significant color to the resultant crystallized polymer.

Another advantage of the nucleating agents useful in the present disclosure is that they can offer process temperature flexibility. For example, the nucleating agents are useful for polymer-process temperatures near or above 180° C., which might compromise the nucleating efficiency of other nucleating agents. Process temperatures near 180° C. are useful, for example, for the crystallization of polyhydroxybutyrate-polyhydroxyvalerate, which can have a melting temperature of about 170° C.

Further, the nucleating agents used in the present disclosure do not require special blending methods when contacted with the polymers to be crystallized. Any standard melt mixing method known in the art may be used. This is in contrast to certain nucleating agents known in the art, which require a plasticizer in order to be incorporated into the polymer. The use of a plasticizer can compromise the mechanical properties of the resultant polymer.

Optionally, the nucleating agent can be contacted with the polymer by standard melt mixing methods including melt blending, solution blending, dry mixing, extrusion mixing, injection molding, pelletizing, blow molding, extrusion sheet forming, inflation forming, contour extrusion forming, vacuum pressure forming, blown film processing, extrusion coating, fiber spinning, or any combination thereof. In one embodiment, mixing the nucleating agent with the polymer will disperse the nucleating agent throughout e polymer.

In one embodiment, the nucleating agent may be selected (or milled to desirable size from a larger particle size) such that the particle size of the nucleating agent is similar in size to that of the polymer. Without being limited by theory, it is believed that where the particle size of the nucleating agent and polymer are similar, that better dispersion and corresponding better crystallization of the polymer results. An example of milling technology useful herein is a pin mill.

c) Temperature

In the present disclosure, a polymer is contacted with a nucleating agent that has a similar crystal structure to PHA or allotropic character at a first temperature, which is from about 5° C. to about 15° C. above the melting point of the polymer.

At a temperature that is about 5° C. to about 15° C. above the melting point of the polymer, the majority of the polymer will be molten. This will allow uniform crystallization throughout the polymer material.

In one embodiment, the first temperature is from about 100° C. to about 190° C. In another embodiment, the first temperature is from about 130° C. to about 190° C. In one embodiment, the first temperature is from about 140° C. to about 180° C.

In one embodiment, the polymer has a melting point of from about 80° C. to about 160° C. In another embodiment, the polymer has a melting point of from about 100° C. to about 150° C. One of skill in the art will recognize that the melting point of a polymer can largely be a function of the repeat units of the polymer, and can be determined by methods known to those of skill in the art.

II. Cooling the Polymer at a Second Temperature

Subsequently, the polymer is cooled at a second temperature, which is approximately the recrystallization temperature of the polymer. In one embodiment, the second temperature is from about 100° C. below the melting point of the polymer to about 60° C. below the melting point of the polymer.

At temperatures around the recrystallization temperature of the polymer, the rate at which a polymer crystal can grow from a primary heterogeneous nucleation site can change, and can have a maximum crystallization rate at a particular temperature that depends on the composition of the polymer. This temperature is known to those of skill in the art as the "maximum linear growth rate" temperature. Conducting crystallization at or near this temperature can provide faster crystallization speeds. In one embodiment, the nucleating agent has a melting point above the temperature of maximum linear growth rate.

In one embodiment, the cooling occurs for a time of from about 3 to about 30 seconds. In another embodiment, the cooling occurs for a time of from about 8 to about 20 seconds. The cooling time can be such that no significant tackiness remains in the polymer and that the mechanical integrity of the polymer is maintained. One of skill in the art will recognize that the cooling time can also depend on the second temperature at which the polymer is cooled.

In one embodiment, the second temperature is from about 50° C. to about 90° C.

In one embodiment, the polymer has a glass transition temperature of from about −30° C. to about 10° C. One of skill in the art will recognize that the glass transition temperature of a polymer can depend on the nature of the repeat units of the polymer, and can be determined by methods known to those of skill in the art.

In one embodiment, the nucleating agent has a melting point above the melting point of PHA.

The cooling times provided by the present disclosure can allow for faster crystallization and therefore faster overall processing of the polymer. These advantages can make the process of the present disclosure more economically feasible than other crystallization processes that are known in the art.

In certain processes the time required to crystallize the polymer is an important feature of the processing. For example, when making polymer films it is advantageous that the polymer material solidifies before contacting the film roll. Accelerating the cooling rate and therefore the crystallization process is advantageous for the manufacture of particular polymers, including films and fibers.

Crystallization of the polymer helps maintain the mechanical integrity of the polymer. Polymers that remain molten can deform, or have undesirable tackiness. For example, a polymer surface should be crystalline to prevent various polymer surfaces from sticking together.

III. Sources of Polymer

The polymer to be crystallized by the present disclosure has at least about 20 mole percent of hydroxyalkanoate repeat units. One of skill in the art will appreciate that polymers obtained or extracted by any available method can be crystallized using the crystallization methods of the present disclosure.

a) PHA-Containing Biomass

PHAs can be extracted from sources including, but not limited to, single-celled organisms, such as bacteria or fungi, and higher organisms, such as plants. These sources, together with the PHAs that are biosynthesized, are collectively referred to herein as "biomass". While biomass can comprise wild-type organisms, they also can comprise genetically engineered species specifically designed for the production of particular PHAs of interest to the grower. Methods for making such genetically engineered organisms are well-known to those skilled in the art.

The biomass containing the PHAs useful herein can be substantially dry. As used herein, "substantially dry" means containing less than about 5% water. Substantially dry biomass can be obtained using processes including, but not limited to, spray or freeze drying, before the extraction process is initiated. In one embodiment, a substantially dry biomass contains less than about 2% water; in another embodiment, less than 1% water, alternatively, the biomass contains no detectable level of water.

Plants useful as biomass organisms include any genetically engineered plant designed to produce PHAs. Such plants include agricultural crops such as cereal grains, oilseeds and tuber plants; other plants include avocado, barley, beet, broad bean, buckwheat, carrot, coconut, copra, corn (maize), cottonseed, gourd, lentil, lima bean, millet, inung bean, oat, oilpalm, pea, peanut, potato, pumpkin, rapeseed (e.g., canola), rice, sorghum, soybean, sugatheet, sugar cane, sunflower, sweet potato, tobacco, wheat, and yam. Such genetically altered fruit-bearing plants useful in the process of the present disclosure include, but are not limited to, apple, apricot, banana, cantaloupe, cherry, grape, kumquat, tangerine, tomato, and watermelon. The plants can be genetically engineered to produce PHAs pursuant to the methods disclosed in Poirier, Y., D. E. Dennis, K. Klomparens and C. Somerville, "Polyhydroxybutyrate, a biodegradable thermoplastic, produced in transgenic plants'" SCIENCE, Vol. 256, pp. 520-523 (1992); and/or U.S. Pat. No. 5,650,555 to Michigan State University, issued Jul. 22, 1997. In one embodiment, the plants are soybean, potato, corn, or coconut plants that are genetically engineered to produce PHAs; in another embodiment, the plant is soybean.

Bacteria that are useful in the present disclosure include any genetically engineered bacteria that can produce PHAs, as well as bacteria that naturally produce PHAs. Examples of such bacteria include those disclosed in NOVEL BIODEGRADABLE MICROBIAL POLYMERS, E. A. Dawes, ed., NATO ASI Series, Series E: Applied Sciences-Vol. 186, Kluwer Academic Publishers (1990); U.S. Pat. No. 5,292,860 to Kanegafuchi Kagaku Kogyo Kabushiki Kaisha, issued Mar. 8, 1994. In one embodiment, the bacterium is *Alcaligenes eutrophus, Escherichia coli, Ralstonia eutropha, Protornanas extorquens, Methylobacterium exiorquens, Pseudornanas putida, Pseudomonas resinovorans, Pseudomonas oleovorans, Pseudomonas aeruginosa, Pseudomonas syringae, Pseudomonas fluorescens, Sphaerotilus natans, Agrobacterium, Rhodobacter sphaeroides, Actinobacillus,* or *Azotobacter vinelandii.*

In one embodiment, the biomass contains a quantity of PHA that is sufficient to make the extraction process described in the present disclosure economically feasible. In another embodiment, the amount of PHAs in the biomass should be at least about 20% of the total dry weight of the biomass; alternatively, at least 50%; alternatively, at least about 60%. In one embodiment, the initial amount of PHA in the biomass is from about 25% to about 90% of the total dry weight.

b) Extraction:

One or more types of PHAs can be extracted from the biomass.

During the extraction, the biomass is combined with a solvent. For example, details regarding the conditions for extracting PHAs from a biomass are available in U.S. Pat. Nos. 5,942,597, 5,918,747, 5,899,339, 5,849,854, and 5,821,299, each assigned to Procter and Gamble. One of skill in the art will appreciate that PHAs obtained or extracted by any available method may be crystallized using the crystallization methods of the present disclosure.

c) Purity

In one embodiment, the polymers useful in the present methods and compositions are at least about 90% pure. Optionally, the polymers are at least about 95% pure, or at least about 98% pure.

Although great care has been taken herein to provide guidance as to the selection of such parameters, one of skill will recognize that the optimal range of unit operating conditions or individual devices can vary according to the type of biomass.

Therefore, the following examples further describe and demonstrate some embodiments within the scope of the present disclosure.

EXAMPLES

Example 1

Poly(3-hydroxybutyrate-co-3-hexanoate) (PHB-Hx) having 8 mol % hexanoate (Mw=750,000) is blended with pentaerythritol, sold under the trademark Charmor PM15. The blend (both powders) is dry mixed at room temperature at 1% by weight pentaerythritol (10 g pentaerythritol to 990 grams of PHB-Hx) to give a total of 1 kg of mixed powder. The powder blend was then pelletized using a twin-screw extruder.

Poly(3-hydroxybutyrate-co-3-hexanoate) (PHB-Hx) having 9 mol % hexanoate (Mw=265,000) is blended with pentaerythritol, sold under the trademark Charmor PM15. The blend (both powders) is dry mixed at room temperature at 1% by weight pentaerythritol (10 g pentaerythritol to 990 grams of PHB-Hx) to give a total of 1 kg of mixed powder. The powder blend was then pelletized using a twin-screw extruder.

To demonstrate nucleation, each blend is then injected molded into dogbone test pieces. The conditions of the injection molding are: Extruder temperature is 155° C. over all zones. The mold temperature is left at ambient temperature (approximately 30° C.). To demonstrate nucleation, the length of time in the mold after filling that is required to produce solid test pieces that would automatically eject from the mold when the mold is pulled apart is measured. For both PHBHx pentaerythritol blends, the cool time was 6 seconds.

Example 2

Poly(3-hydroxybutyrate-co-3-valerate) (PHBV), sold under the trademarked name Enmat, is blended with pentaerythritol, sold under the trademark Charmor PM15. The blend (both powders) is dry mixed at room temperature at 2% by weight pentaerythritol (2.0 g pentaerythritol to 980 grams of PHB-Hx) to give a total of 1 kg of mixed powder. The powder blend was then used directly for injection molding.

To demonstrate nucleation, each blend is then injected molded into dogbone test pieces. The conditions of the injection molding are: Extruder temperature is 160° C./170° C./180° C./175° C./175° C. (nozzle). The mold temperature is left at ambient temperature (approximately 30° C.). For the PHBV pentaerythritol blend, the cool time, which is the time after the mold is filled, is 6 seconds.

For the PHBHx and PHBV that is prepared in similar manner but without pentaerythritol, the cool time is greater than 60 seconds. Cool time is proportional to crystallization time. In general, a longer cool time demonstrates slower crystallization. Injection molded pieces comprised of PHA without a nucleating agent can take days to completely crystallize.

What is claimed is:

1. A polymeric composition comprising:
   a polymer including at least 20 mole percent hydroxyalkanoate repeat units, and
   a nucleating agent, in an amount from about 0.01% to about 20% by weight of the polymer, wherein the nucleating agent is selected from the group consisting of dipentaerythritol, anatase, wulfenite, aragonite, sulfur, selenium, phosphorous, benzamide, and mixtures thereof.

2. The polymeric composition of claim 1, wherein the nucleating agent is present in an amount from about 0.5% to about 5% by weight of the polymer.

3. The polymeric composition of claim 1, wherein the polymer is hydroxybutyrate-hydroxyhexanoate copolymer.

4. The polymeric composition of claim 1, wherein the polymer has a first repeat unit having the structure:

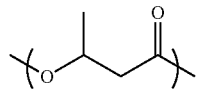

and a second repeat unit having the structure:

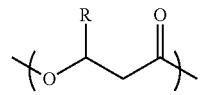

wherein each R is independently a $C_3$ to $C_{19}$ alkyl group, and wherein the polymer includes from about 75 mole percent to about 99 mole percent of the first repeat unit and from about 1 mole percent to about 25 mole percent of the second repeat unit.

5. The polymeric composition of claim 1, wherein the polymer has a weight average molecular weight from about 10,000 to about 3,000,000 daltons.

6. The polymeric composition of claim 1, wherein the polymer has a melting point from about 100° C. to about 150° C.

7. The polymeric composition of claim 1, wherein the polymer has a glass transition temperature from about −30° C. to about 10° C.

8. A process for crystallizing a polymer, comprising the steps of:
   admixing a polymer including at least 20 mole percent of hydroxyalkanoate repeat units with a nucleating agent, in an amount from about 0.01% to about 20% by weight of the polymer, at a first temperature, which is from about 5° C. to about 15° C. above the melting point of the polymer; and
   cooling the mixture to a second temperature, which is from about the glass transition temperature of the polymer to about the melting point of the nucleating agent,
   wherein the nucleating agent is selected from the group consisting of dipentaerythritol, anatase, wulfenite, aragonite, sulfur, selenium, phosphorous, benzamide, and mixtures thereof.

9. The method of claim 8, wherein the first temperature is from about 100° C. to about 190° C.

10. The method of claim 8, wherein the second temperature is from about 50° C. to about 90° C.

11. The method of claim 8, wherein the nucleating agent is present in an amount from about 0.5% to about 5% by weight of the polymer.

12. The method of claim 8, wherein the polymer is hydroxybutyrate-hydroxyhexanoate copolymer.

13. The method of claim 8, wherein the polymer has a weight average molecular weight from about 10,000 to about 3,000,000 daltons.

14. The method of claim 8, wherein the polymer has a melting point from about 100° C. to about 150° C.

15. The method of claim 8, wherein the polymer has a glass transition temperature from about −30° C. to about 10° C.

16. The method of claim 8, wherein the polymer has a first repeat unit having the structure:

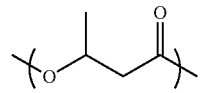

and a second repeat unit having the structure:

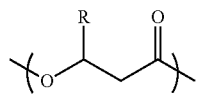

wherein each R is independently a $C_3$ to $C_{19}$ alkyl group, and wherein the polymer includes from about 75 mole percent to about 99 mole percent of the first repeat unit and from about 1 mole percent to about 25 mole percent of the second repeat unit.

17. The method of claim 8, wherein the nucleating agent transitions from a crystalline form which is not orthorhombic, hexagonal, or tetragonal to a crystalline form which is orthorhombic, hexagonal, or tetragonal during the cooling step.

* * * * *